(12) United States Patent
Kim et al.

(10) Patent No.: US 12,221,236 B2
(45) Date of Patent: Feb. 11, 2025

(54) SMART SURVEILLANCE SYSTEM AND SMART SURVEILLANCE CONTROL METHOD USING UAV

(71) Applicant: Korea University Research and Business Foundation, Seoul (KR)

(72) Inventors: Joongheon Kim, Seoul (KR); Haemin Lee, Seoul (KR)

(73) Assignee: Korea University Research and Business Foundation, Seoul (KR)

(*) Notice: Subject to any disclaimer, the term of this patent is extended or adjusted under 35 U.S.C. 154(b) by 145 days.

(21) Appl. No.: 17/977,081

(22) Filed: Oct. 31, 2022

(65) Prior Publication Data

US 2023/0169838 A1 Jun. 1, 2023

(30) Foreign Application Priority Data

Nov. 26, 2021 (KR) .......................... 10-2021-0164993

(51) Int. Cl.
| | | |
|---|---|---|
| *G06N 3/08* | (2023.01) | |
| *B64U 10/13* | (2023.01) | |
| *G08B 13/196* | (2006.01) | |
| *G16Y 20/10* | (2020.01) | |
| *G16Y 40/10* | (2020.01) | |
| *G16Y 40/50* | (2020.01) | |
| *B64U 101/31* | (2023.01) | |

(52) U.S. Cl.
CPC ............... *B64U 10/13* (2023.01); *G06N 3/08* (2013.01); *G08B 13/1966* (2013.01); *G16Y 20/10* (2020.01); *G16Y 40/10* (2020.01); *G16Y 40/50* (2020.01); *B64U 2101/31* (2023.01)

(58) Field of Classification Search
CPC ............ G08B 13/1966; G08B 13/1965; B64C 39/024; G06N 3/08; G06N 3/006; G06N 3/045; G06N 5/01; G16Y 20/10; G16Y 40/10; G16Y 40/50; B64U 2101/30; B64U 2101/21; B64U 2101/31; B64U 10/13; B64U 2101/00; G06Q 50/10; G06Q 30/08; G08C 17/02
See application file for complete search history.

(56) References Cited

U.S. PATENT DOCUMENTS

| | | | |
|---|---|---|---|
| 2021/0165405 A1* | 6/2021 | Hong | G05D 1/0027 |
| 2023/0297847 A1* | 9/2023 | Turner | G06N 3/082 |
| | | | 706/15 |

FOREIGN PATENT DOCUMENTS

| | | |
|---|---|---|
| KR | 10-1648188 B1 | 8/2016 |
| KR | 10-1895811 B1 | 9/2018 |
| KR | 10-2254491 B1 | 5/2021 |
| KR | 10-2286417 B1 | 8/2021 |
| KR | 10-2298063 B1 | 9/2021 |

* cited by examiner

Primary Examiner — Hesham K Abouzahra
(74) Attorney, Agent, or Firm — NSIP Law

(57) ABSTRACT

Provided is a smart surveillance system that includes one unmanned aerial vehicle (UAV), a plurality of Internet of Things (IoT) terminals distributed in a surveillance area, and a plurality of base stations distributed in the surveillance area, wherein the UAV selects any IoT terminal from among the plurality of IoT terminals using deep learning auction training, receives surveillance data from the selected IoT terminal, and transmits the surveillance data to a data center through the Internet and any one base station among the plurality of base stations.

8 Claims, 6 Drawing Sheets

SMART SURVEILLANCE SYSTEM AND SMART SURVEILLANCE CONTROL METHOD USING UAV

CROSS-REFERENCE TO RELATED APPLICATION

This application claims priority to and the benefit of Korean Patent Application No. 10-2021-0164993, filed on Nov. 26, 2021 in the Korean Intellectual Property Office, the disclosure of which is incorporated herein by reference in its entirety.

BACKGROUND

1. Field of the Invention

The present invention relates to a smart surveillance system and a smart surveillance control method using an unmanned aerial vehicle (UAV), and more particularly, to a smart surveillance system and a smart surveillance control method for performing surveillance using a UAV in a smart city environment in which the Internet of Things is common.

2. Discussion of Related Art

Conventionally, for the safety and security against crime such as theft, arson, fraud, etc. or the safety and security for people, property, or public order, surveillance using closed-circuit televisions (CCTVs) provided in the streets has become common. Due to the smart city environment in which the Internet of Things is common and the tremendous growth of Internet of Things applications, it is possible to secure such safety and security.

Here, data collection using unmanned aerial vehicles (UAVs) such as drones may contribute to the construction of a surveillance system in a smart city environment.

Image data collected by the UAVs is transmitted to terrestrial base stations for safe data analysis. In this case, when the coverage of a wireless network is relatively larger than a wireless communication coverage of the system, it is not always possible to transmit the image data to the terrestrial base stations, and thus a distributed and autonomous algorithm is required necessarily.

In particular, in consideration of the mobility and flexibility of the UAVs, a new algorithm is needed for the surveillance system to collect surveillance information.

In addition, in consideration of constraint conditions such as batteries, moving distances, and the like of the UAVs, the surveillance system should be able to selectively collect surveillance information on a point of interest (PoI).

DOCUMENT OF RELATED ART

Patent Document

Patent Document: Korean Patent Registration No. 10-1648188

SUMMARY OF THE INVENTION

The present invention is directed to solving the above problems and providing a smart surveillance system that performs surveillance using an unmanned aerial vehicle (UAV) in a smart city environment in which the Internet of Things is common.

The present invention is also directed to providing a smart surveillance control method for performing surveillance using a UAV in a smart city environment in which the Internet of Things is common.

According to an aspect of the present invention, there is provided a smart surveillance system including one UAV, a plurality of Internet of Things (IoT) terminals distributed in a surveillance area, and a plurality of base stations distributed in the surveillance area, wherein the UAV selects any IoT terminal from among the plurality of IoT terminals using deep learning auction training, receives surveillance data from the selected IoT terminal, and transmits the surveillance data to a data center through the Internet and any one base station among the plurality of base stations.

In the smart surveillance system according to an embodiment of the present invention, the UAV may include a controller provided with a deep learning auction training network, a transceiver connected to the controller, and a storage unit connected to the controller, wherein the controller may select any IoT terminal from among the plurality of IoT terminals using the deep learning auction training network.

In the smart surveillance system according to an embodiment of the present invention, the deep learning auction training network may include a plurality of monotonic networks, one allocation network connected to the plurality of monotonic networks, and one payment network connected to the plurality of monotonic networks.

According to another aspect of the present invention, there is provided a smart surveillance control method including an operation (A) of starting, by a controller of a UAV, smart surveillance control while wirelessly transmitting a surveillance data request signal to a plurality of IoT terminals distributed in a surveillance area, an operation (B) of receiving, by the controller, a quotation weight ($b_i$) from each of the plurality of IoT terminals, an operation (C) of inputting, by the controller, the quotation weight ($b_i$) to a deep learning auction training network provided therein and performing deep learning auction training, an operation (D) of setting, by the controller, a movement route to an IoT terminal having a final weight p detected by performing the deep learning auction training, and an operation (E) of receiving, by the controller, surveillance data from the IoT terminal having the final weight p as surveillance information and transmitting the surveillance information to a data center through base stations and the Internet.

In the smart surveillance control method according to another embodiment of the present invention, in the operation (B), the quotation weight ($b_i$) may be calculated using a data redundancy ($s_i$) and a displacement ($d_i$) between the UAV and the IoT terminal.

In the smart surveillance control method according to another embodiment of the present invention, the deep learning auction training network may include a plurality of monotonic networks, one allocation network connected to the plurality of monotonic networks, and one payment network connected to the plurality of monotonic networks.

In the smart surveillance control method according to another embodiment of the present invention, the operation (C) may further include an operation (C-1) of inputting, by the controller, the quotation weight ($b_i$) to each of the plurality of monotonic networks and converting the input quotation weight ($b_i$) into a plurality of virtual evaluation weights ($\overline{b}_i$), an operation (C-2) of inputting, by the controller, the plurality of virtual evaluation weights ($\overline{b}_i$) to the allocation network and determining an IoT terminal corresponding to a highest virtual evaluation weight) ($\overline{b}_i$), and an operation (C-3) of inputting, by the controller, the plurality of virtual evaluation weights ($\overline{b}_i$) to the payment network and determining a final weight (p) indicated by the IoT terminal having the highest virtual evaluation weight ($\overline{b}_i$).

In the smart surveillance control method according to another embodiment of the present invention, the controller may repeatedly perform the operations (B) to (E) in order to select the next IoT terminal that will receive surveillance data and collect the surveillance data.

The features and advantages of the present invention will become more apparent from the following detailed descriptions taken with reference to the accompanying drawings.

Prior to this, terms and words used in this specification and claims should not be interpreted as limited to commonly used meanings or meanings in dictionaries and should be interpreted with meanings and concepts which are consistent with the technological scope of the present invention based on the principle that the inventors have appropriately defined concepts of terms in order to describe the present invention in the best way.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
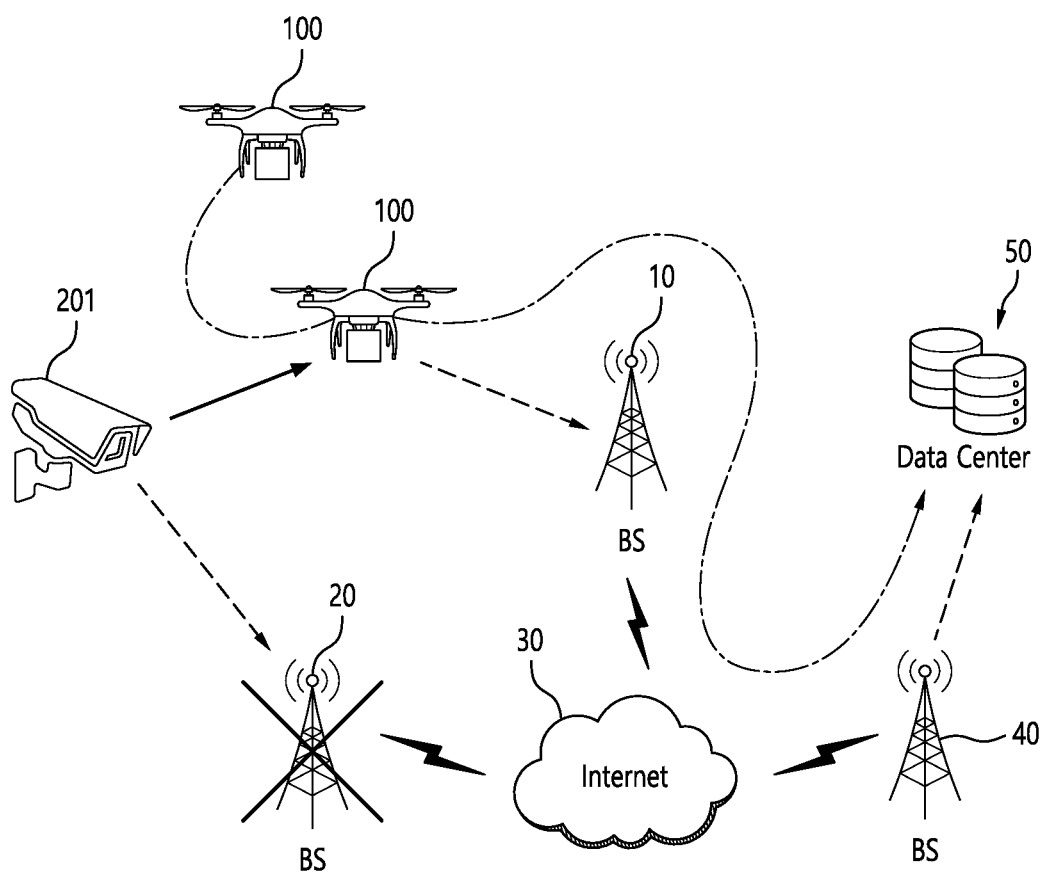
FIG. 1 is an exemplary diagram illustrating the operation of a smart surveillance system according to an embodiment of the present invention.

Purposes, specific advantages, and novel features of the present invention will be clear from exemplary embodiments and the following detailed descriptions in connection with the accompanying drawings. In this specification, when reference numerals are assigned to components of each drawing, it should be noted that, when the same components are illustrated in different drawings, the same numerals are assigned to the same components whenever possible. It will be understood that, although the terms "first," "second," etc. may be used herein to describe various elements, these elements should not be limited by these terms. These terms are only used to distinguish one element from another. Further, in descriptions of the present invention, when detailed descriptions of related known configurations or functions are deemed to unnecessarily obscure the gist of the present invention, they will be omitted.

Figure 2:
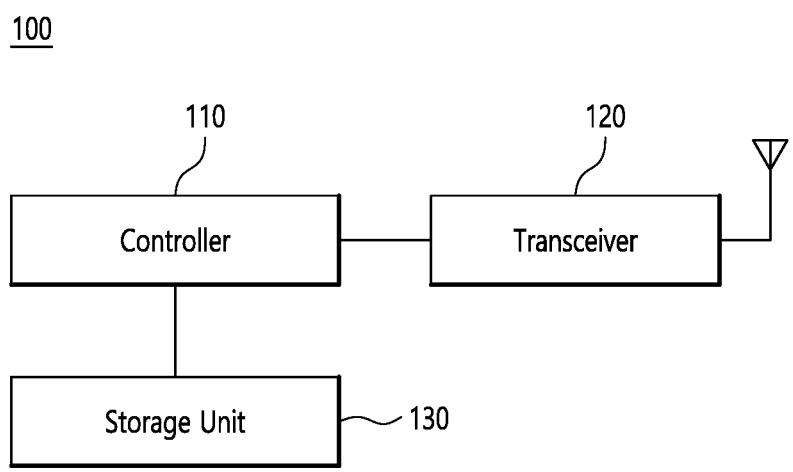
FIG. 2 is a configuration diagram of an unmanned aerial vehicle (UAV) constituting the smart surveillance system according to the embodiment of the present invention.

Hereinafter, exemplary embodiments of the present invention will be described in detail with reference to the accompanying drawings. FIG. 1 is an exemplary diagram illustrating the operation of a smart surveillance system according to an embodiment of the present invention, and FIG. 2 is a configuration diagram of an unmanned aerial vehicle (UAV) constituting the smart surveillance system according to the embodiment of the present invention.

As illustrated in FIG. 1, the smart surveillance system according to the embodiment of the present invention may include one UAV 100, a plurality of Internet of Things (IoT) terminals distributed in a surveillance area, a plurality of base stations distributed in the surveillance area, the Internet 30, and a data center 50. Here, the IoT terminals are a plurality of IoT terminals 201, 202, 203, 204, 205, 206, 207, and 208 including an IoT terminal 201, which are connected to each of a plurality of closed-circuit televisions (CCTVs) distributed in the surveillance area, and the IoT terminals may convert images captured through the CCTVs into surveillance data to transmit the converted surveillance data to the UAV 100.

In such a smart surveillance system, the UAV 100 may selectively collect the surveillance data generated by the plurality of IoT terminals using deep learning auction training, and may transmit the collected surveillance data to the data center 50 through the Internet 30 and a base station 10 that can communicate with the UAV 100 among a plurality of base stations.

The UAV 100 is an unmanned aerial vehicle that automatically or semi-automatically flies along a movement route without a pilot directly boarding therein, and may be, for example, a drone. As illustrated in FIG. 2, the UAV 100 may include a controller 110, a transceiver 120, and a storage unit 130.

Specifically, the controller 110 has a deep learning auction training network therein, and receives quotation weights from the plurality of IoT terminals through the transceiver 120 to perform deep learning auction training, sets the movement route to an IoT terminal corresponding to a final weight obtained as a result of the deep learning auction training to move the UAV 100, and receives surveillance data from the IoT terminal corresponding to the final weight through the transceiver 120 to transmit the surveillance data to the data center 50 through the Internet 30 and the base station 10 that can communicate with the UAV 100.

Figure 4:
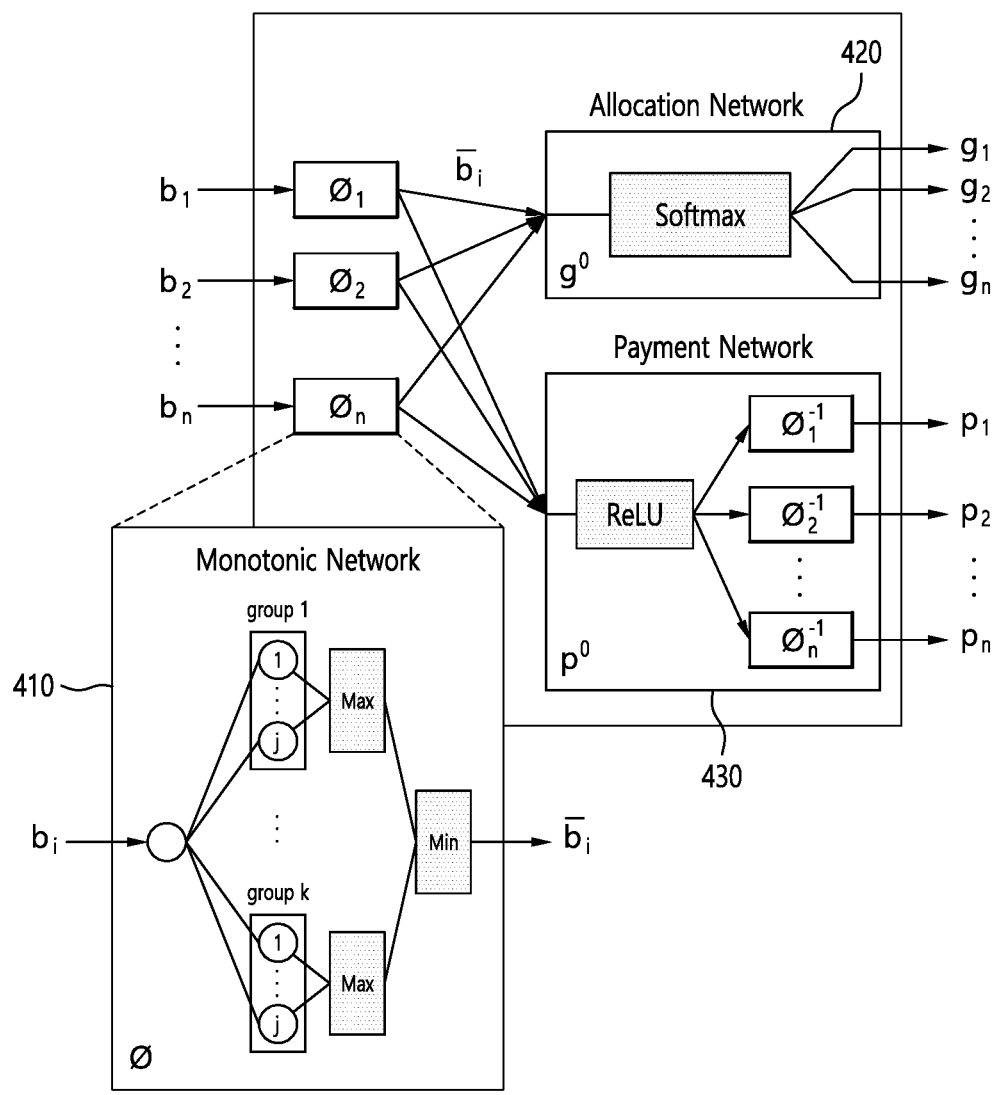
FIG. 4 is a structural diagram of a deep learning auction training network according to the smart surveillance control method according to another embodiment of the present invention.

Here, the deep learning auction training network may include a plurality of monotonic networks 410, one allocation network 420 connected to the plurality of monotonic networks 410, and one payment network 430 connected to the plurality of monotonic networks 410, as illustrated in FIG. 4.

The transceiver 120 receives the quotation weights from the respective IoT terminals distributed in the surveillance area via a wireless network under the control of the controller 110 to transmit the quotation weights, and receives the surveillance data from the IoT terminal corresponding to the final weight to transmit the surveillance data. Here, examples of the wireless network include a $3^{rd}$ Generation Partnership Project (3GPP) network, a Long-Term Evolution (LTE) network, a $5^{th}$ generation (5G) mobile network, a Worldwide Interoperability for Microwave Access (WiMAX) network, the Internet, a local area network (LAN), a wireless local area network (WLAN), a wide area network (WAN), a personal area network (PAN), a Wi-Fi network, a Bluetooth network, a satellite broadcasting network, an analog broadcasting network, a digital multimedia broadcasting (DMB) network, and the like, but the present invention is not limited thereto.

The storage unit 130 is connected to the controller 110 to store deep learning auction training data, receives the quotation weights from the plurality of IoT terminals to store the received quotation weights, and stores the surveillance data received from the IoT terminal corresponding to the final weight.

The UAV 100 configured as described above may process the quotation weights received from the plurality of IoT terminals by performing the deep learning auction training to obtain the final weight, move to the IoT terminal corresponding to the final weight to selectively collect the surveillance data, and transmit the surveillance data to the data center 50 through the Internet 30 and the base station 10 that can communicate with the UAV 100.

Accordingly, in the smart surveillance system according to the embodiment of the present invention, the UAV 100 may selectively collect the surveillance data in consideration of distance and data similarity for the plurality of IoT terminals, and thus economic efficiency can be improved.

Figure 3:
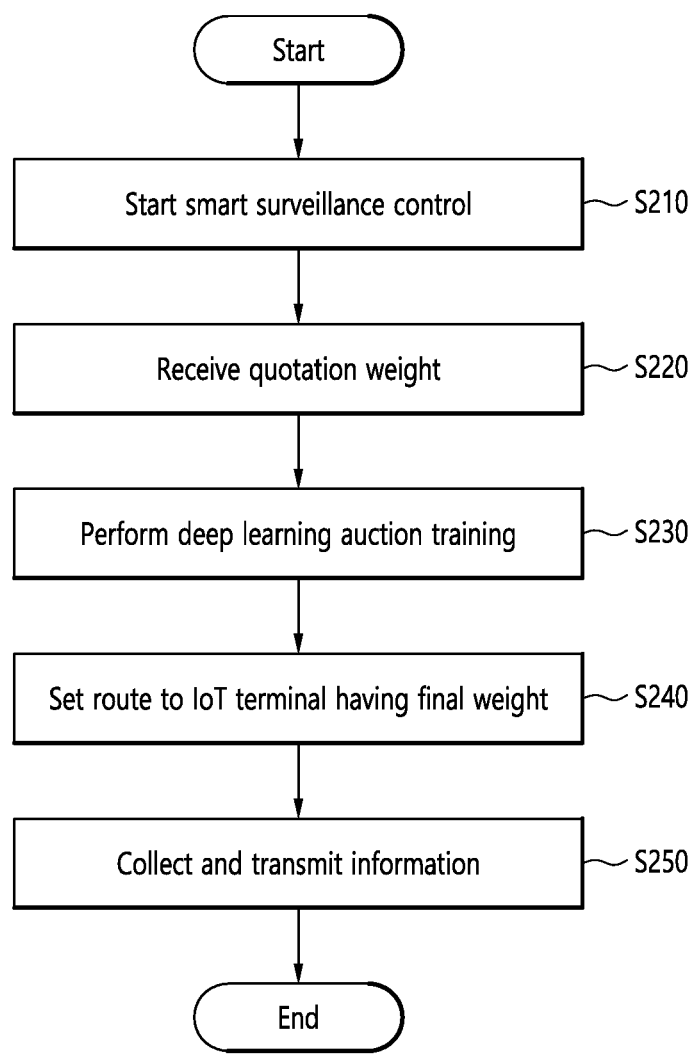
FIG. 3 is a flowchart for describing a smart surveillance control method according to another embodiment of the present invention.
Figure 5:
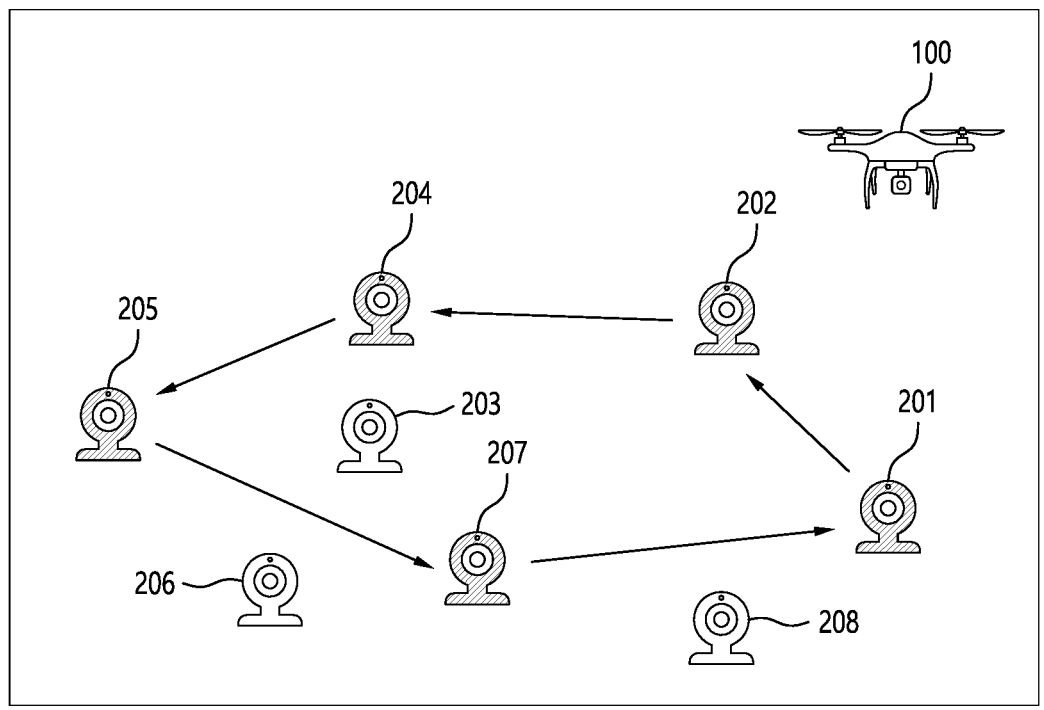
FIG. 5 is an exemplary diagram illustrating a route setting process according to the smart surveillance control method according to another embodiment of the present invention.
Figure 6:
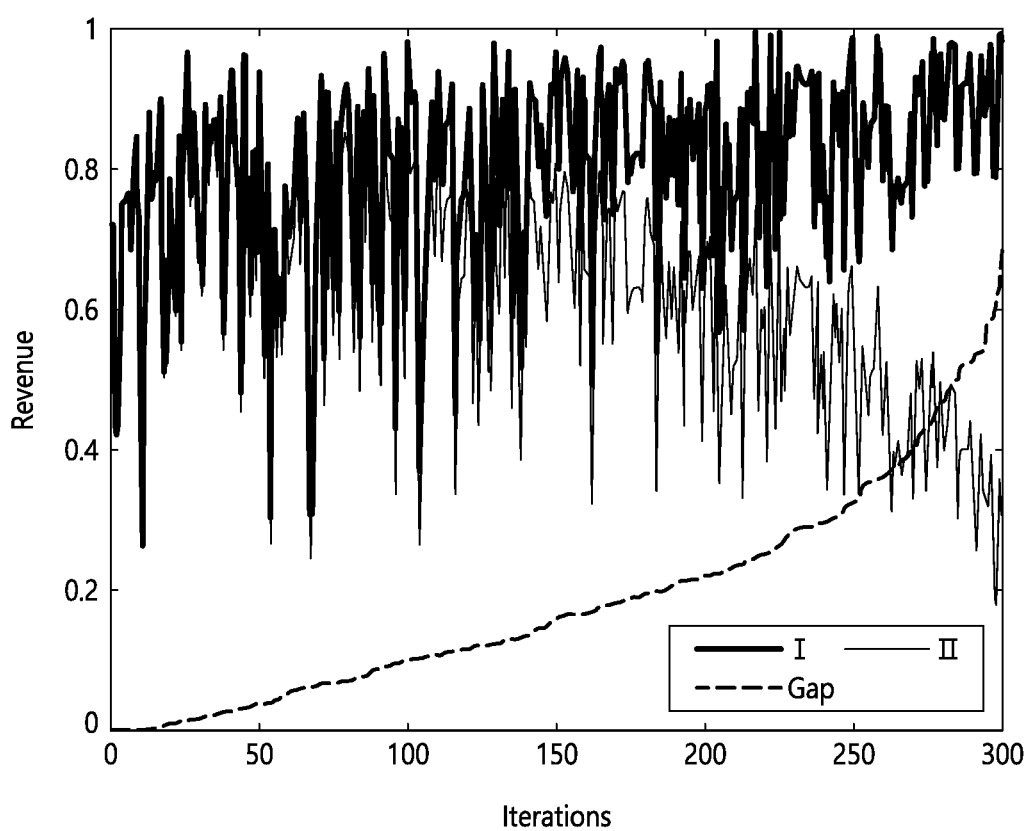
FIG. 6 is a graph showing the efficiency of the smart surveillance control method according to another embodiment of the present invention.

Hereinafter, a smart surveillance control method according to another embodiment of the present invention will be described with reference to FIGS. 3 to 6. FIG. 3 is a flowchart for describing a smart surveillance control method according to another embodiment of the present invention, FIG. 4 is a structural diagram of a deep learning auction training network according to the smart surveillance control method according to another embodiment of the present invention, FIG. 5 is an exemplary diagram illustrating a route setting process according to the smart surveillance control method according to another embodiment of the present invention, and FIG. 6 is a graph showing the efficiency of the smart surveillance control method according to another embodiment of the present invention.

In the smart surveillance control method according to another embodiment of the present invention, a UAV 100 starts smart surveillance control while wirelessly transmitting a surveillance data request signal to a plurality of IoT terminals 201, 202, 203, 204, 205, 206, 207, and 208 for collecting surveillance data (S210).

Upon receiving the surveillance data request signal, each of the plurality of IoT terminals 201, 202, 203, 204, 205, 206, 207, and 208 determines a quotation weight $b_i$ in consideration of a data redundancy $s_i$ and a displacement $d_i$ between the UAV 100 and the IoT terminal, and transmits the determined quotation weight $b_i$ to the UAV 100.

Here, the quotation weight $b_i$ may be defined as a relationship between the data redundancy $s_i$ and the displacement $d_i$ as shown in [Equation 1] below.

$$b_i = \frac{s_i}{d_i}$$

$$d_i = \sqrt{(x_u(t) - x_i)^2 + (y_u(t) - y_i)^2}$$

$$s_i = MSE = \frac{1}{mn}\sum_{i=0}^{m-1}\sum_{i=0}^{n-1}[I(i,j) - K(i,j)]^2$$

[Equation 1]

Here, the data redundancy $s_i$ is calculated through a mean square error for all pixels of an image having a size of m×n, K(i, j) denotes an image of surveillance data collected by the UAV 100 in a previous round, and I(i, j) denotes an image of surveillance data that each IoT terminal currently has.

Further, the displacement $d_i$ denotes a linear distance according to position coordinates ($x_u(t)$, $y_u(t)$) of the UAV 100 at a time point t and coordinates ($x_i$, $y_i$) of each IoT terminal.

As the data redundancy $s_i$ decreases and the displacement $d_i$ increases, the quotation weight $b_i$ has a smaller value, and thus the possibility that the UAV 100 collects the surveillance data is reduced.

When the determined quotation weight $b_i$ is transmitted, the controller 110 of the UAV 100 receives the quotation weight $b_i$ from each of the plurality of IoT terminals 201, 202, 203, 204, 205, 206, 207, and 208 through the transceiver 120 (S220).

The controller 110 of the UAV 100 performs deep learning auction training by inputting the quotation weight $b_i$ to the deep learning auction training network provided therein (S230).

Specifically, as illustrated in FIG. 4, the controller 110 inputs the quotation weight $b_i$ to each of a plurality of monotonic networks 410 composed of max/min operations over several linear functions and converts the input quotation weight $b_i$ into a virtual evaluation weight $\bar{b}_i$ using a virtual evaluation function $\phi_i$ of [Equation 2] below.

$$\phi_i(b_i) = \max_{\forall k \in K} \min_{\forall j \in J}(\omega_{kj}^i b_i + \beta_{kj}^i)$$

[Equation 2]

Here, $\omega_{kj}^i$ and $\beta_{kj}^i$ denote neural network parameters of the monotonic networks 410, J denotes the number of linear functions, K denotes the number of groups, and each group consists of J linear functions.

Thereafter, the controller 110 inputs a plurality of virtual evaluation weights $\bar{b}_i$ to one allocation network 420 to determine an IoT terminal corresponding to the highest virtual evaluation weight $\bar{b}_i$.

Specifically, the controller 110 inputs the plurality of virtual evaluation weights $\bar{b}_i$ to the allocation network 420 and calculates allocation probabilities using a softmax function together with a dummy input, $\bar{b}_{N+1}=0$, as shown in [Equation 3] below.

$$g_i(\bar{b}_i) = softmax_i(\bar{b}_1, \ldots, \bar{b}_{N+1}; k)$$

$$= \frac{e^{k\bar{b}_i}}{\sum_{j=1}^{N+1} e^{k\bar{b}_j}}, \forall \in N$$

[Equation 3]

The controller 110 may calculate the allocation probabilities using the softmax function, detect an allocation probability $g_i$ of each of the plurality of virtual evaluation weights $\bar{b}_i$, and determine an IoT terminal corresponding to the highest value among values of the allocation probabilities $g_i$.

At the same time, the controller 110 inputs the plurality of virtual evaluation weights $\bar{b}_i$ to one payment network 430 to determine a final weight p indicated by the IoT terminal having the highest virtual evaluation weight $\bar{b}_i$.

That is, the controller 110 may input the plurality of virtual evaluation weights $\bar{b}_i$ to the payment network 430 and calculate a rectified linear unit (ReLU) activation function represented by [Equation 4] below to determine the final weight p.

$$p(\bar{b}_i) = ReLU\left(\max_{\forall j \neq i} \bar{b}_j\right), \forall \in N$$

[Equation 4]

In order to apply [Equation 4], the payment network 430 may be configured to convert the virtual evaluation function $\phi_i$ used in the monotonic networks 410 into an inverse function, and the payment network 430 determines the second highest result value among the plurality of result values determined in this way as the final weight p.

Next, the controller 110 trains neural network parameters $\omega$ and $\beta$ by configuring the plurality of quotation weights $b_i$ input to the monotonic networks 410 as a training set and minimizes a loss function $\hat{R}$ of [Equation 5] below.

$$\hat{R}(\omega,\beta) = -\Sigma_{i=1}^{N} g_i^{(\omega,\beta)} x p_i^{(\omega,\beta)} \qquad \text{[Equation 5]}$$

Here, $g_i$ denotes the allocation probability, $p_i$ denotes the final weight, and $\omega$ and $\beta$ denote the neural network parameters.

The loss function $\hat{R}$ may be minimized during the training process, and this may be considered the same as maximizing collection of data of the UAV 100.

After the controller 110 detects the IoT terminal having the final weight p in this way, the controller 110 sets the movement route to the IoT terminal having the final weight p (S240).

That is, as illustrated in FIG. 5, after the UAV 100 collects the surveillance data from the IoT terminal 201 and transmits the collected surveillance data, the controller 110 may detect a proximity IoT terminal 202 as the IoT terminal having the final weight p, and set the movement route to the proximity IoT terminal 202.

The controller 110 moves the UAV 100 to the proximity IoT terminal 202 along the movement route to receive the surveillance data from the proximity IoT terminal 202 as surveillance information and transmit the surveillance information to the data center 50 through the base station and the Internet 30 (S250).

Thereafter, in order to select a next IoT terminal that will receive the surveillance data, move the UAV 100, and collect the surveillance data, the controller 110 repeats operation S220 of receiving the quotation weight $b_i$ and operation S250 of transmitting the surveillance information.

Accordingly, as illustrated in FIG. 5, the UAV 100 collects the surveillance data as the surveillance information while flying through an optimized route moving from the proximity IoT terminal 202 to other IoT terminals 204, 205, and 207.

Such selection of the movement route is performed whenever each of the next IoT terminals that will receive the surveillance data is selected, and thus it is possible to improve economic efficiency by selectively collecting the surveillance data for the plurality of IoT terminals in consideration of the displacement $d_i$ and the data similarity $s_i$.

The efficiency of the smart surveillance control method according to another embodiment of the present invention may be compared with reference to Comparative Example and Example.

COMPARATIVE EXAMPLE

As experimental conditions, a 6 km×6 km surveillance area is set and 10 IoT terminals are distributed in the surveillance area. A process of collecting, by one UAV, surveillance data from the IoT terminals in a conventional second price auction method is performed 300 times, and thus a yield is detected.

EXAMPLE

As experimental conditions, a 6 km×6 km surveillance area is set and 10 IoT terminals are distributed in the surveillance area. A process of collecting, by one UAV, surveillance data from the IoT terminals according to the smart surveillance control method according to another embodiment of the present invention is performed 300 times, and thus a yield is detected.

It can be seen that results of each of Comparative Example and Example may be shown in a result graph I of the Comparative Example and a result graph II of Example as illustrated in FIG. 6, and a difference Gap between the result graph I of Comparative Example and the result graph II of Example increases up to 300 times.

Accordingly, it can be seen that the smart surveillance control method according to another embodiment of the present invention has considerable efficiency in economic terms as compared to the conventional second price auction method.

According to the smart surveillance system according to the embodiment of the present invention, a UAV can selectively collect surveillance data in consideration of distance and data similarity for a plurality of IoT terminals, and thus economic efficiency can be improved.

According to the smart surveillance control method according to another embodiment of the present invention, surveillance data can be selectively collected using deep learning auction training, and thus economic efficiency can be improved.

Although the technical scope of the present invention has been specifically described with reference to the above exemplary embodiments, it should be noted that the above-described embodiments are for the purpose of explanation and not for the limitation thereof.

In addition, it will be understood by those skilled in the art that various embodiment may be made without departing from the scope of the present invention.

What is claimed is:

1. A smart surveillance system comprising:
    one unmanned aerial vehicle (UAV) comprising a controller provided with a deep learning auction training network;
    a plurality of Internet of Things (IoT) terminals distributed in a surveillance area; and
    a plurality of base stations distributed in the surveillance area,
    wherein the UAV selects any IoT terminal from among the plurality of IoT terminals using deep learning auction training, receives surveillance data from the selected IoT terminal, and transmits the surveillance data to a data center through the Internet and any one base station among the plurality of base stations, and
    wherein the controller starts smart surveillance control while wirelessly transmitting a surveillance data request signal to a plurality of Internet of Things (IoT) terminals distributed in the surveillance area;
    receives a quotation weight ($b_i$) from each of the plurality of IoT terminals;
    inputs the quotation weight ($b_i$) to the deep learning auction training network provided therein and performs deep learning auction training;
    sets a movement route to an IoT terminal having a final weight p detected by performing the deep learning auction training; and
    receives surveillance data from the IoT terminal having the final weight p as surveillance information and transmits the surveillance information to the data center through the plurality of base stations and the Internet.

2. The smart surveillance system of claim 1, wherein the UAV comprises:

a transceiver connected to the controller; and
a storage unit connected to the controller.

3. The smart surveillance system of claim 2, wherein the deep learning auction training network comprises a plurality of monotonic networks, one allocation network connected to the plurality of monotonic networks, and one payment network connected to the plurality of monotonic networks.

4. A smart surveillance control method comprising:
- an operation (A) of starting, by a controller of an unmanned aerial vehicle (UAV), smart surveillance control while wirelessly transmitting a surveillance data request signal to a plurality of Internet of Things (IoT) terminals distributed in a surveillance area;
- an operation (B) of receiving, by the controller, a quotation weight ($b_i$) from each of the plurality of IoT terminals;
- an operation (C) of inputting, by the controller, the quotation weight ($b_i$) to a deep learning auction training network provided therein and performing deep learning auction training;
- an operation (D) of setting, by the controller, a movement route to an IoT terminal having a final weight p detected by performing the deep learning auction training; and
- an operation (E) of receiving, by the controller, surveillance data from the IoT terminal having the final weight p as surveillance information and transmitting the surveillance information to a data center through base stations and the Internet.

5. The smart surveillance control method of claim 4, wherein, in the operation (B), the quotation weight ($b_i$) is calculated using a data redundancy ($s_i$) and a displacement ($d_i$) between the UAV and the IoT terminal.

6. The smart surveillance control method of claim 4, wherein the deep learning auction training network includes a plurality of monotonic networks, one allocation network connected to the plurality of monotonic networks, and one payment network connected to the plurality of monotonic networks.

7. The smart surveillance control method of claim 6, wherein the operation (C) further includes:
- an operation (C-1) of inputting, by the controller, the quotation weight ($b_i$) to each of the plurality of monotonic networks and converting the input quotation weight ($b_i$) into a plurality of virtual evaluation weights ($\overline{b}_i$);
- an operation (C-2) of inputting, by the controller, the plurality of virtual evaluation weights ($\overline{b}_i$) to the allocation network and determining an IoT terminal corresponding to a highest virtual evaluation weight ($\overline{b}_i$); and
- an operation (C-3) of inputting, by the controller, the plurality of virtual evaluation weights ($\overline{b}_i$) to the payment network and determining a final weight (p) indicated by the IoT terminal having the highest virtual evaluation weight ($\overline{b}_i$).

8. The smart surveillance control method of claim 4, wherein the controller repeatedly performs the operations (B) to (E) in order to select the next IoT terminal that will receive surveillance data and collect the surveillance data.

* * * * *